June 13, 1961 R. L. ACRES 2,987,811
METHOD OF MOUNTING A CAPTIVE FASTENER
Filed Sept. 24, 1957
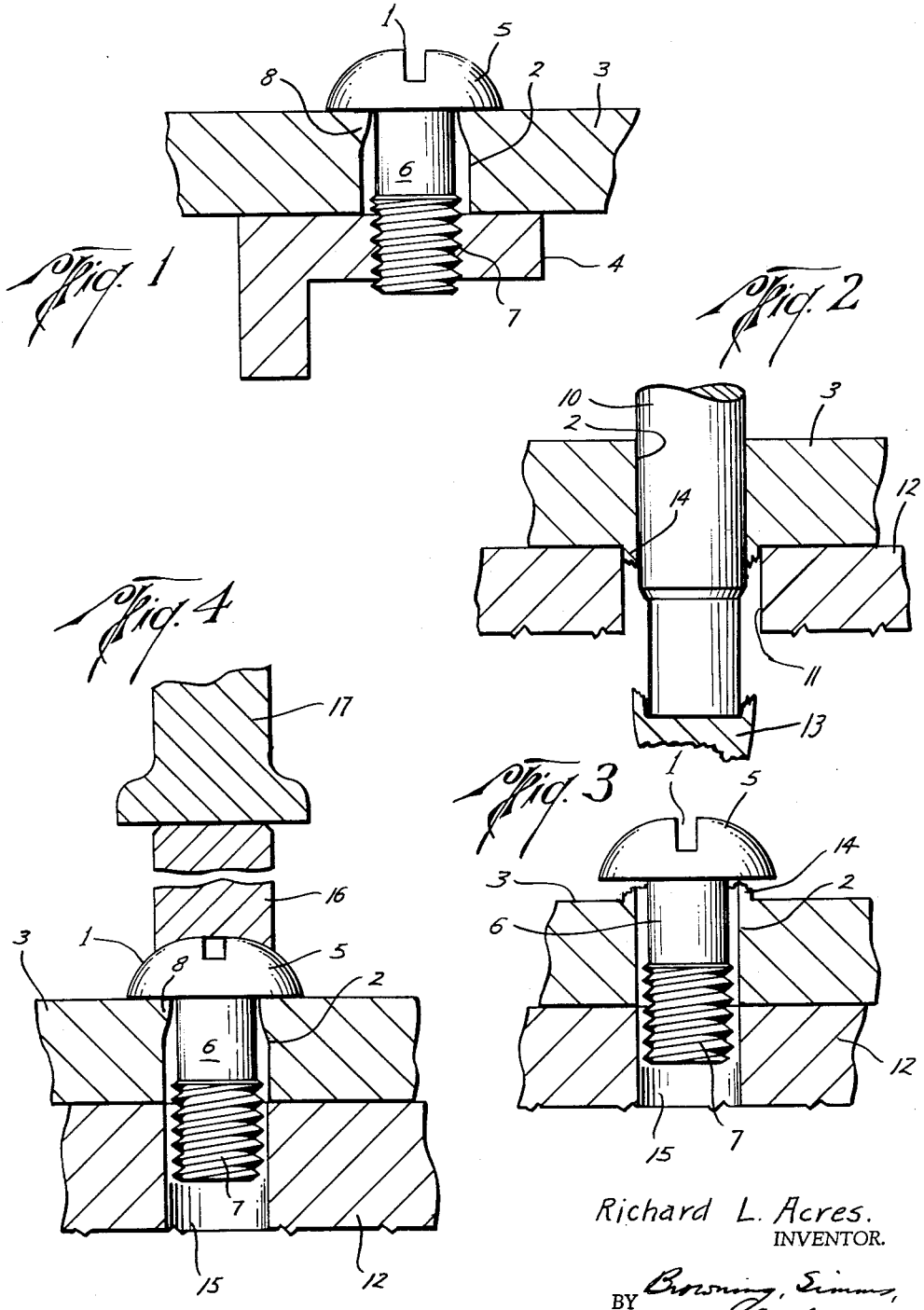
Richard L. Acres.
INVENTOR.
BY
ATTORNEYS United States Patent Office 2,987,811
Patented June 13, 1961

2,987,811
METHOD OF MOUNTING A CAPTIVE FASTENER
Richard L. Acres, Houston, Tex., assignor to
W. F. Curlee, Houston, Tex.
Filed Sept. 24, 1957, Ser. No. 685,900
2 Claims. (Cl. 29—437)

This invention relates to fastening devices. More specifically, the invention relates to the portions of fasteners which are captured in a body of material before being joined to the other portion of the fastener.

Prior art devices have developed various arrangements for holding the male portions of fasteners captive in bodies having a relatively thin sheet form. The form and material of these bodies have made the method feasible whereby holes have been punched or drilled through the thin body sheets and given a diameter smaller than the threaded section of a screw and the body bent in ways to enlarge the hole enough to permit the screw to be positioned through the hole with its neck entirely within the hole. The sheet of thin material has then been bent toward its original shape, the hole returned to substantially its original size, and the neck, being smaller than the threaded portion, has been loosely captured in the hole. Structure formed in this manner is illustrated in at least Bell 1,854,730.

However, where it has been desirable to use a body of form and material where bending cannot be effectively employed, the prior art fails to teach how an elongated male fastening member, such as a screw, can be captured in such body with simplicity and effectiveness. An example of such methods as have been used is illustrated by providing a tapped opening in material of this nature and then turning a screw entirely through the threads until the unthreaded neck on the screw passes through the threaded opening. This, and similar methods, are cumbersome and expensive. The present invention provides great improvement in the art of producing captive fasteners, particularly in bodies of material which can not be effectively bent.

A primary object of the invention is to provide a method for capturing an elongated male portion of a fastener, such as a screw, in a hole through a body of material which is of form and/or composition to make it impractical to bend the material of the body about the hole to enlarge and receive the male portion therethrough.

Another object of the invention is to provide a method for capturing an elongated male portion of a fastener, such as a screw, in a hole through a body of material which is of form and/or composition that bending it is impractical to enlarge the hole to receive the male portion therethrough, the method being more simple and carried out with greater facility than previous methods.

Another object of the invention is to provide a method for capturing an elongated male fastener portion in a hole of a body of material by extending, or flowing ductile material about the hole into a recess of the fastener portion received through the hole.

Another object is to provide a captured screw and capturing body in which the threaded portion of the screw extends into the capturing body and provides maximum thread engagement with a female portion with which the threaded portion engages.

The method of the invention comprehends capture of an elongated male fastener portion in a hole of a body of material, the hole having been formed by penetration with a tool. A ductile portion of material, integral with the body of material, is formed adjacent the hole. The fastener portion is passed through the hole and the ductile material adjacent the hole is extruded, or flowed, into a recess of the fastener portion.

The method of this invention also comprehends capturing an elongated male fastener portion in a hole of a body of ductile material, which hole has been formed by punching or drilling and thereby extruding an upset formation of the material about the hole, integral with the material and above the plane of the surface of the material. The method includes passing the fastener portion through the hole and extruding, or flowing, the material of the upset formation into a recess of the fastener portion.

The invention further comprehends loosely capturing a screw in a hole of a body of ductile material, which hole has a formation of the material raised about the hole above the plane of the body. The method includes inserting the screw through the hole of a size to pass its threaded portion and pressing its head on the raised formation to flow the formation material into the hole to loosely form, about the shank of the screw, a capturing hole.

Other objects, advantages and features of this invention will appear from a consideration of the drawings together with the written specification and claims. In the drawings wherein like reference numerals are used to indicate like parts:

FIG. 1 is a sectioned elevation of a structure formed with a method embodying the invention;

FIG. 2 is a sectioned elevation of structure illustrating an initial step of punching in a method embodying the invention;

FIG. 3 is a sectioned elevation of the structure of FIG. 2 illustrating another step in the method; and FIG. 4 is a sectioned elevation of the structure of FIG. 3 showing the final step in the method embodying the invention.

Referring to FIG. 1, there is illustrated a screw captured in a hole of a capturing body and on which a female nut member is made up. The screw 1, as an elongated male portion of a fastener, has been captured in a hole 2 of body 3, employing the method of the invention. The method of the invention makes available the maximum number of threads on screw 1 for engaging female nut member 4.

The screw 1 is comprised of a head portion 5, a neck 6 and threaded portion 7. Although the head 5 may be given any of various forms which have been developed, the conventional slotted form is illustrated here and preferably with a flat underside. The neck 6 is preferably formed without threads and with a diameter smaller than that of the threaded portion 7. The threaded length 7 is illustrative of various forms of the active portions of male fasteners. It is to be noted that the preferred threaded form 7 extends a finite distance into the hole 2 insuring full thread engagement with nut member 4. This feature, provided by the invention, gives the maximum strength available, through the threads, for the fastening of female nut member 4 to body 3.

The screw 1 is loosely held in body 3 prior to being engaged with female member 4. The loose holding is accomplished specifically by extruding ductile material, integral with body 3, into hole 2 until the material forms an abutment transverse the hole axis and into the recess on screw 1, formed by neck 6 between head 5 and threaded portion 7. The abutment is specifically illustrated, in FIG. 1, as protuberance 8. This protuberance, shown in cross-section in FIG. 1, appears in the form of an annular portion of the wall of hole 2, brought inwardly toward screw neck 6, until screw threaded portion 7 cannot pass through it, but not so far as to interfere with the manual turning of screw 1.

The captive screw and capturing body combination is produced by the steps employed in the method of the present invention. These steps are illustrated with FIGS. 2, 3 and 4 in which the material of body 3 is worked into the form to produce the preferred embodiment of FIG. 1.

FIG. 2 illustrates the initial step of the method in penetrating body 3 to form hole 2. Body 3 may take various forms, but is more commonly regarded as a sheet of material. The form of body 3, as a sheet, is defined at the location of the desired capture of the screw by two opposite surfaces which determine its thickness, and may be so thick that bending it to enlarge hole 2 is impractical. The composition of the material of body 3 may also be a factor in making bending impractical. Therefore, the present invention contemplates penetrating body 3 with a punching tool 10; aligned with a first hole 11 in a die. The die may be a part of a back-up base table or other support and serves to support against bending during the punching of that portion of the body around the location of the intended screw capture.

Hole 11 is sized somewhat larger than hole 2 in order to leave an annular space about tool 10 and in hole 11 within which a portion of the material of body 3 is extruded by the downwardly moving tool 10. A portion of the material of body 3 will be removed by the point of tool 10. Section 13 illustrates the removed, or punched-out, portion of body 3 which falls through the hole 11 as waste. The extruded portion 14 remains and is of sufficient size so that when extruded directly back into the punched hole 2 will give to said hole a transverse dimension less than the diameter of the screw threads but greater than the diameter of the screw neck 6. When the body 3 is turned over, this portion 14 can be described as an upset, raised formation, integral with body 3 and adjacent hole 2.

It is first appreciated that formation 14 need not be produced in precisely the way described to attain the object of the invention. Body 3 could be drilled and formation 14 made integral with the body in other ways. However, once formation 14, of ductile material, is placed adjacent hole 2 and integral with body 3 it can be flowed, or extruded, toward the axis of hole 2 until the desired abutment is produced to capture screw 1.

FIGS. 3 and 4 illustrate the preferred manner of working the formation 14 to produce the abutment or protuberance 8 of FIG. 1. These steps of the method are preferred because of their simplicity and the ease with which they can be carried out with conventional tools. The results of employing these steps are found in greatly speeded production of captive screws which lowers both material and labor costs. Where the capturing body has a dimension and/or material which does not lend itself to being bent to enlarge a hole for receiving a screw to be captured, this method offers a simple, positive, fast method of capturing screws.

FIG. 3 illustrates the body 3 with its hole 2 aligned with a second hole 15 in die 12. Screw 1 is positioned in hole 2. The head has its flat underside brought down against formation 14. This arrangement provides for the material of body 3 about hole 2 to be solidly backed up by die 12 as head 5 is brought down on formation 14.

FIG. 4 illustrates the final step of extruding formation 14 into protuberance 8. Although head 5 could be directly struck with sufficient force to extrude the ductible material of formation 14 down into hole 2, it is generally advisable to protect the slot of the head from being deformed. Consequently, tool 16 is provided to fit the curvature of the head 5 and exert its force over a large part of that area. The force is provided from that driving a hammer member 17 which may be manually brought down on tool 16. This force is transmitted through the underside of the head 5 and formation 14 is flowed into the form of abutment protuberance 8. The sizes of punch 10 and first hole 11 cause formation 14 to be sized with the volume which will size protuberance 8 large enough to give effective abutment to the threads of 7 but small enough to loosely capture the neck 6.

It is to be understood that this final step illustrated in FIG. 4 could be accomplished in other ways. As an example, a tool could direct a force transverse the axis of hole 2, directly on the formation 14 to extrude all, or a portion, of it toward the screw neck. However, the illustrated step is preferred, simply utilizing the underside of the head 5 to extend the formation down into the hole 2.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method for rotatably capturing in a body of ductile material a screw having adjacent its head a neck with a diameter smaller than that of the threads including, punching a hole through the body of material of a size which will closely pass the screw threads with a tool punch aligned with a first hole in a back-up base table sized to allow for the tool punch to remove a finite portion of the material of the body therethrough and to extrude a portion of the material of the body between the tool punch and the walls of the back-up base table first hole without bending the body, inserting the screw through the hole formed in the body of material in a direction opposite to that from which the hole in the body was punched and into a second hole in a back-up base table which is substantially of the size of the hole punched in the body, and striking the head of the screw with a hammer tool to cause the underside of the screw head to flow the extruded portion of the body material into the body hole toward the axis thereof and about the screw neck to form a retaining ridge which will loosely capture the screw between the head and threads.

2. A method for rotatably capturing at a predetermined location in a body of ductile material having two opposite surfaces including said location and defining a thickness of the body, a screw which has a head and screw threads and a neck intermediate the head and threads of smaller diameter than that of the screw threads, including, simultaneously punching a hole through the body at said location of a size which will closely pass the threads of the screw and by said punching operation extruding from the hole into a portion adjacent the hole raised above one of said surfaces of the body an amount of material sufficient to give said hole a transverse dimension less than the diameter of said threads but greater than the diameter of said neck if extruded directly back into said hole, and supporting said one surface of the body around the predetermined location against bending during said punching and extruding, placing the screw through the hole in a direction opposite to that from which the hole was punched so that said neck is located within said raised portion and said head against the raised portion, and, by forcing the head against the raised portion while supporting the body opposite the head and about the hole against bending, extruding at least part of the raised portion of material back into and inwardly from the wall of the punched hole adjacent the neck of the screw sufficiently to give the hole about said neck a transverse dimension less than the diameter of said threads and limit withdrawal of the screw from the hole but insufficient to prevent its rotation therein.

References Cited in the file of this patent

UNITED STATES PATENTS

| | | |
|---|---|---|
| 219,333 | Wilson | Sept. 2, 1879 |
| 241,841 | Brinton | May 24, 1881 |
| 1,854,730 | Bell | Apr. 19, 1932 |
| 2,010,853 | Dyer | Aug. 13, 1935 |
| 2,127,969 | Dingwerth | Aug. 23, 1938 |
| 2,177,191 | Sandberg | Oct. 24, 1939 |
| 2,599,312 | Andres | June 3, 1952 |
| 2,761,484 | Sternick et al. | Sept. 4, 1956 |
| 2,829,696 | Wagner | Apr. 8, 1958 |

FOREIGN PATENTS

| | | |
|---|---|---|
| 395,321 | Great Britain | Oct. 6, 1930 |
| 617,140 | Great Britain | Feb. 1, 1949 |